United States Patent [19]

Chopin et al.

[11] Patent Number: 5,045,301

[45] Date of Patent: Sep. 3, 1991

[54] MOLDABLE/EXTRUDABLE TITANIUM DIOXIDE PARTICULATES

[75] Inventors: Thierry Chopin, Saint Denis; Patrick Fourre, Paris; Eric Quemere, Cormeilles/en/Parisis, all of France

[73] Assignee: Rhone-Poulenc Chimie, Courbevoie, France

[21] Appl. No.: 373,450

[22] Filed: Jun. 30, 1989

[30] Foreign Application Priority Data

Jul. 1, 1988 [FR] France .................. 88 08911

[51] Int. Cl.$^5$ ............................ C01G 23/04
[52] U.S. Cl. .................... 423/610; 423/611; 423/612; 423/615; 423/616
[58] Field of Search .............. 423/610, 611, 612, 615, 423/616; 502/350; 106/436

[56] References Cited

U.S. PATENT DOCUMENTS

| Re. 21,693 | 1/1941 | Plechner et al. | 423/612 |
| 1,914,557 | 6/1933 | Craver | 502/350 |
| 2,113,946 | 4/1938 | Plechner et al. | 423/612 |
| 2,290,922 | 7/1942 | Verduin | 423/612 |
| 2,519,389 | 8/1950 | Mayer | 423/612 |
| 4,388,288 | 6/1983 | Dupin et al. | 423/416 |

FOREIGN PATENT DOCUMENTS

| 0141696 | 5/1985 | European Pat. Off. | |
| 813757 | 6/1937 | France | |
| 828741 | 5/1938 | France | |
| 8804169 | 11/1988 | France | |
| 0039296 | 4/1978 | Japan | 423/610 |
| 0117259 | 7/1983 | Japan | 106/436 |
| 0481633 | 8/1975 | U.S.S.R. | 106/436 |
| 662502 | 5/1979 | U.S.S.R. | |
| 0715476 | 2/1980 | U.S.S.R. | 106/436 |
| 308725 | 6/1930 | United Kingdom | |
| 481892 | 3/1938 | United Kingdom | 423/612 |
| 497694 | 12/1938 | United Kingdom | 423/611 |

Primary Examiner—Gary P. Straub
Assistant Examiner—Steven Bos
Attorney, Agent, or Firm—Burns, Doane, Swecker & Mathis

[57] ABSTRACT

Poorly crystallized or amorphous TiO$_2$ particulates having a mean particle size greater than 20 nm are prepared by thermally hydrolyzing a titanium compound in solution, in the presence of at least one carboxylic acid containing a hydroxyl and/or amino group, or an organophosphoric acid; the TiO$_2$ particulates thus produced are readily molded/extruded into useful shaped articles, e.g., catalysts or catalyst supports, having good porosity and mechanical properties.

17 Claims, 1 Drawing Sheet

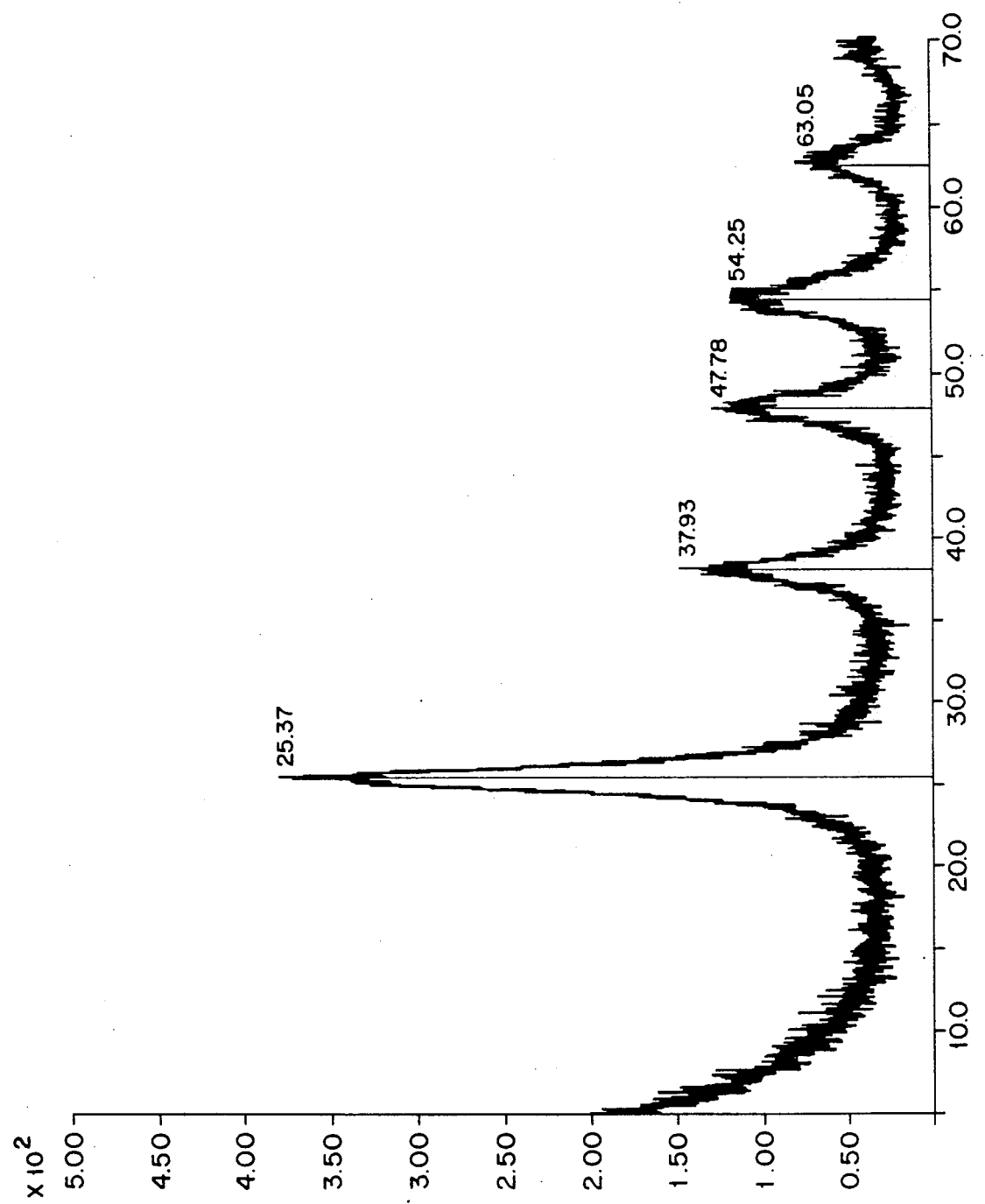

MOLDABLE/EXTRUDABLE TITANIUM DIOXIDE PARTICULATES

BACKGROUND OF THE INVENTION

1. Field of the Invention

The present invention relates to the production of shaped articles of titanium dioxide, and, more especially, to the production of a particular titanium dioxide well suited for shaping operations.

2. Description of the Prior Art

At the present time, in certain industrial processes, such as, for example, the denitriding and/or desulfurization of flue gases, the Claus process for the production of elemental sulfur, and the like, catalysts based on titanium dioxide are preferably employed. Furthermore, these catalysts are used in the form of a bed in columns. Whatever their form, it should limit the loss of catalyst charged. Thus, these catalysts are most typically produced by shaping a powder thereof, for example by molding, extrusion, or the like.

However, these $TiO_2$ catalysts must also have good mechanical properties, to prevent wear by attrition. In addition, they must have good impact strength and a porosity or specific surface to provide high catalytic efficiency.

EP 38,741 describes a process for the shaping of titanium dioxide to provide articles having good mechanical properties and having adequate porosity for their use as catalysts or catalyst supports.

Moreover, such titanium dioxide suitable for shaping is produced by the hydrolysis of a solution of titanium sulfate, or a solution obtained by the sulfuric acid decomposition of ilmenite.

The titanium dioxides produced by the hydrolysis of another titanium compound, such as titanium oxychloride, cannot be used to shape articles having good mechanical properties and a specific surface or porosity sufficient to be used for catalysis.

For example, Japanese Patent No. 53/095,893 indicates that the titanium dioxide produced by the hydrolysis of titanium chloride cannot be formed.

SUMMARY OF THE INVENTION

Accordingly, a major object of the present invention is the provision of articles shaped from a titanium dioxide powder produced by the thermal hydrolysis of a titanium compound, having good mechanical properties and a high specific surface.

Briefly, the present invention features a process for the preparation of a particular titanium dioxide capable of being readily formed into useful shaped articles, comprising hydrolyzing a titanium compound in the presence of at least one of the following compounds:

(a) an acid containing at least one carboxyl group and at least two hydroxyl and/or amine groups, or at least two carboxyl groups and at least one hydroxyl and/or amine group, or salt thereof; or (b) an organophosphoric acid having one of the formulae:

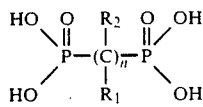

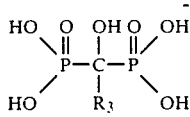

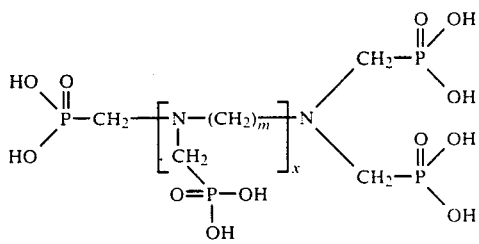

BRIEF DESCRIPTION OF THE DRAWING

The FIGURE of Drawing is an X-ray diffraction pattern of the titanium dioxide particulates prepared according to the present invention.

DETAILED DESCRIPTION OF THE PREFERRED EMBODIMENTS OF THE INVENTION

More particularly according to the present invention, in the above formulae n and m are integers ranging from 1 and 6, x is an integer number ranging from 0 to 5, and $R_1$, $R_2$, and $R_3$, which may be identical or different, are each a hydroxyl, amino, aralkyl, aryl or alkyl radical, or a hydrogen atom.

The titanium dioxide thus produced may be shaped after filtering and drying.

In one embodiment of the invention, the acid compound added to the medium to be hydrolyzed is an organic compound, preferably a substituted or unsubstituted aliphatic compound.

Such organic compound will contain from 1 to 15 carbon atoms, preferably from 1 to 10 carbon atoms.

Exemplary acid compounds suitable for use according to the invention are, for example:

(i) hydroxypolycarboxylic acids and more particularly hydroxydi- or hydroxytricarboxylic acids, such as, for example, malic acid, citric acid and tartronic acid;

(ii) (polyhydroxy)monocarboxylic acids, such as, for example, glucoheptonic acid and gluconic acid;

(iii) poly(hydroxycarboxylic) acids, such as, for example, tartaric acid;

(iv) dicarboxylic aminoacids and their corresponding amides, such as, for example, aspartic acid, asparagine, glutamic acid and glutamine;

(v) monocarboxylic aminoacids, whether or not hydroxylated, such as, for example, lysine, serine, tyrosine, hydroxyproline, threonine and arginine;

(vi) methylene aminotriphosphonates, such as, for example, methylene ethylenediaminotetraphosphonate, methylene triethylenetetraaminohexaphosphonate, methylene tetraethylenepentaaminoheptaphosphonate and methylene pentaethylenehexaaminooctaphosphonate;

(vii) methylene diphosphonates, and those of 1,1'-ethylene, 1,2-ethylene, 1,1'-propylene, 1,3-propylene, 1,6-hexamethylene, as well as 2,4-dihydroxypentamethylene-2,4-diphosphonate; 2,5-dihydroxyhexamethylene-2,5-diphosphonate; 2,3-dihydroxybutylene-2,3-diphosphonate; 1-hydroxybenzyl-1,1'-diphosphonate; 1-aminoethylene-1,1'-diphosphonate; hydroxymethylene diphosphonate; 1-hydroxyethylene-1,1'diphosphonate; 1-hydroxypropylene-1,1'-diphosphonate; 1-hydroxybutylene-1,1'-diphosphonate; and 1hydroxyhexamethylene-1,1'-diphosphonate.

Salts of these acids are also suitable for use according to the invention. The preferred salts are those of the alkali metals, such as those of sodium, or the ammonium salts.

The concentration of the acid compound in the solution of the titanium compound to be hydrolyzed is not critical.

For example, such concentration may range from about 0.01 mole/liter to about 1 mole/liter, and preferably from about 0.01 mole/liter to 0.1 mole/liter.

Similarly, the concentration of the titanium compound in the solution to be hydrolyzed is not critical.

This concentration preferably ranges from about 0.1 mole/liter to about 5 mole/liter, expressed as titanium values.

In another embodiment of the invention, the hydrolysis is carried out at a temperature greater than or equal to 70° C. However, the hydrolysis may be carried out at a lower temperature, but with lesser reaction kinetics.

The solid precipitate formed, which is in the form of titanium dioxide or ortho- or metatitanic acid, is recovered, for example, by filtration. Such solids may be washed to eliminate impurities which may be present, then dried, for example in an oven.

X-ray diffraction analysis evidences that the final product is a poorly crystallized titanium dioxide, crystallized in the anatase state.

An analysis of the dimensions and nature of the elementary particles of this final product titanium dioxide evidences that it comprises aggregates of crystallites. These aggregates have a mean dimension greater than 20 nanometers, typically ranging from 30 to 70 nanometers. These elementary particulates have dimensions clearly larger than those produced by the hydrolysis of the same compounds in the absence of the organic compounds described above.

Without wishing to be bound by any particular theory, this difference in the dimensions of such elementary particles of final product titanium dioxide could explain the difference in the behavior of the titanium dioxide during forming and, in particular, as regards the production of shaped articles having good mechanical properties.

This invention also features a process for the production of shaped articles by forming the titanium dioxide produced by the process described above. This process comprises preparing a mixture, for example by malaxation, containing 45% to 99% by weight of a powder comprising elementary particles having a dimension greater than 20 nm, preferably ranging from 30 to 70 nm, of the titanium dioxide prepared according to the invention and dried to an ignition weight loss of 1% to 50%, 1% to 40% by weight of water and 0% to 15% by weight of forming additives, and then shaping such mixture, for example by extrusion, molding or the like, and optionally drying and calcining the resulting shaped article. The aforementioned concentration in water corresponds to the water added to the mixture and does not take into account the water of constitution of the titanium dioxide powder.

In a preferred embodiment of the invention, the mixture contains 55% to 94.9% by weight of such titanium dioxide, 5% to 35% by weight of water and 0.1 to 10% by weight of forming additives.

The shaped articles produced by this process of the invention have a notable solidity or crush strength, and exceptional attrition properties, together with a high specific surface, which in particular may be as high as 300 $m^2/g$. Furthermore, their porosity and pore size distribution are readily controlled.

Thus, as indicated in EP 38,741, the specific surface area of such shaped articles may range from 5 to 300 $m^2/g$, depending on the temperature of calcination.

The pore volume of the final shaped articles ranges from 0.05 to 0.5 $cm^3/g$. The pore volume is easily controlled by the selection of the nature of the forming additives and the ignition weight loss of the mixture to be shaped, together with the selection of the calcining temperature. It is also possible to control the pore volume by the addition to the mixture of pore-forming agents, such as, for example, carbon, wood, crystalline cellulose, starch, organic polymers, and the like.

The forming additives that may be used in the process according to the invention are those conventionally employed in molding processes. These additives provide the paste, obtained by malaxation, with rheological properties suitable for molding. Exemplary of such additives are cellulose, carboxymethylcellulose, carboxyethylcellulose, tall oil, xanthan gums, surface active agents, flocculating agents such as the polyacrylamides, carbon black, starches, stearic acid, polyacrylic alcohol, polyvinyl alcohol, biopolymers, glucose, polyethylene glycols, inorganic acids, etc.

In another embodiment of the process of the invention, prior to molding, a component selected from among silica, alumina, clays, silicates, titanium sulfate, ceramic fibers, alkaline earth sulfates, or the like, may be added to the mixture.

The mixture is shaped by different methods, such as, for example, by extrusion or molding. It is thereby possible to produce articles of different shapes. Exemplary are spherical, cylindrical, pellet, ball, granule or honeycomb configurations, or extrusions having multilobar cross-sections.

The forming devices that may be employed for carrying out the process according to the invention are, for example, pelleting machines, granulators, extruders, and the like.

The shaped articles thus produced may be used, in particular, as catalysts in the denitrification and desulfurizing processes of gases, for example of residual industrial gases, or in the Claus process for the production of elemental sulfur.

They may also be used as catalyst supports in combination with different catalytic phases deposited onto the surface of the subject titanium dioxide by means of processes well known to this art. It is thus possible to produce denitridification catalysts by the deposition thereon of tungsten or vanadium, or oxidizing catalysts, in particular for hydrogen sulfide, by the deposition thereon of nickel, iron and cobalt, for example.

In order to further illustrate the present invention and the advantages thereof, the following specific examples are given, it being understood that same are intended only as illustrative and in nowise limitative.

EXAMPLE 1

To one liter of a solution of titanium oxychloride containing one mole of Ti, 0.05 mole tartaric acid of the formula:

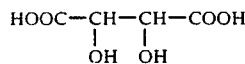

was added.

The solution was then heated to boiling and maintained at this temperature for 4 hours.

After cooling, the solution was filtered and the solids obtained washed with one liter of distilled water, then dried. The drying of the product was carried out by different methods and advantageously by atomization. The powder had an ignition weight loss of 20%.

X-ray diffraction analysis indicated that the final product was titanium dioxide present only in the anatase phase and that it was weakly crystallized. Indeed, its X-ray diffraction pattern, shown in the attached single FIGURE of Drawing, included very broad, low intensity rays, which is characteristic of a weakly crystalline material.

Analysis of the product by TEM (transmission electron microscopy) showed that it comprised elementary particles having a mean dimension of approximately 50 nanometers.

500 g of this powder were mixed with 130 g water and 60 g of a forming additive, nitric acid in the present case, for 1 hour in a Kustner mixer (commercial designation).

The mixture obtained had the following composition:
(i) 69% $TiO_2$ powder;
(ii) 21% water (water added);
(iii) 10% $HNO_3$ (forming additive)

This mixture was extruded into cylindrical granules having a diameter of 3.2 nm.

These extrusions were dried at 120° C. for 8 hours and calcined at 350° C. for 2 hours.

The articles or extrusions obtained had the following properties, determined by conventional analytical techniques:
(a) Specific surface: 200 m$^2$/g;
(b) Total pore volume: 32 cm$^3$/g;
(c) Crushing strength of grains: 1 daN/mm.

EXAMPLE 2

To one liter of a titanium oxychloride solution containing 0.5 mole Ti, 0.1 mole citric acid of the following formula was added:

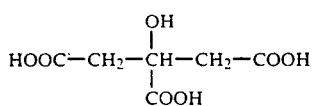

The solution obtained in this manner was treated as in Example 1.

The titanium dioxide powder obtained had the same characteristics as that of Example 1 and extrusion thereof utilizing the process of Example 1 made it possible to produce shaped articles having the same characteristics as those of Example 1.

EXAMPLE 3

The procedure of Example 2 was repeated under the same conditions, except that the citric acid was replaced by aspartic acid of the formula:

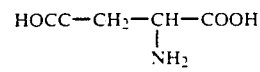

Here again, the solids obtained were titanium dioxide in the anatase form, weakly crystallized and identical to that of Example 1.

EXAMPLE 4

The procedure of Example 2 was repeated under the same conditions, except that the citric acid was replaced by sodium glucoheptonate of the formula:

$HO-CH_2(CHOH)_5-COO\ Na$

The solids obtained were a weakly crystallized titanium dioxide identical to that produced in Example 1.

COMPARATIVE EXAMPLE 5

The procedure of Example 1 was repeated, but omitting the addition of tartaric acid. The solids were washed and not dried; they were then resuspended at pH 1.0, whereupon settlement occurred spontaneously. X-ray diffraction analysis indicated that it entirely comprised titanium dioxide in the rutile form.

Transmission electron microscopy analysis of the powder obtained also showed that it comprised crystallites having dimensions of about 5 nanometers.

This powder was dried as in Example 1, and a forming experiment was carried out as in Example 1.

Following a very vigorous malaxation, an extrudable paste was obtained. The granules obtained, after drying and calcination at a temperature of 200° C. or more, had poor properties.

The granules could not be handled, as they disintegrated when grasped between two fingers, or when contacting each other.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of shapable titanium dioxide particulates, comprising thermally hydrolyzing a solution of a titanium compound in the presence of at least one acid including organophosphoric acid having one of the formulae:

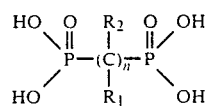

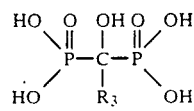

-continued

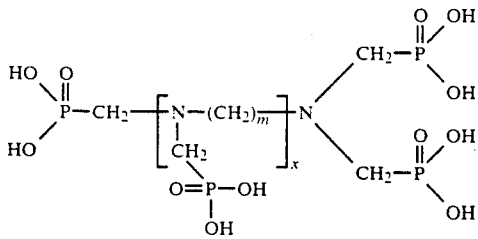

wherein n and m are integers ranging from 1 to 6, x is an integer ranging from 0 to 5, and $R_1$, $R_2$ and $R_3$ which may be identical or different, are each a hydroxyl, amino, aralkyl, aryl or alkyl radical, or a hydrogen atom.

2. The process as defined by claim 1, wherein the at least one acid further comprises at least one carboxylic acid which comprises (a) at least one carboxyl group and at least (i) two hydroxyl groups or (ii) at least two amino groups or (iii) at least two hydroxyl and amino groups, or which comprises (b) at least two carboxyl groups and (i) at least one hydroxyl group or (ii) at least one amino group or (iii) at least one hydroxyl and amino group, or salt thereof.

3. The titanium dioxide particulates prepared by the process as defined by claim 1.

4. The process as defined by claim 1, said at least one acid comprising a hydrocarbyl moiety.

5. The process as defined by claim 1, said at least one acid comprising an aliphatic moiety.

6. The process as defined by claim 4, said hydrocarbyl moiety having from 1 to 15 carbon atoms.

7. The process as defined by claim 6, said hydrocarbyl moiety having from 1 to 10 carbon atoms.

8. The process as defined by claim 1, said at least one acid comprising a hydroxypolycarboxylic acid, a polyhydroxymonocarboxylic acid, a poly(hydroxycarboxylic) acid, an aminodicarboxylic acid or amide thereof, or an aminomonocarboxylic acid or hydroxylated derivative thereof.

9. The process as defined by claim 8, said at least one acid comprising malic acid, citric acid, tartronic acid, glucoheptonic acid, gluconic acid, tartaric acid, aspartic acid, asparagine, glutamic acid, glutamine, lysine, serine, tyrosine, hydroxyproline, threonine or arginine.

10. The process as defined by claim 1, said at least one acid comprising methyleneaminotriphosphonate, methyleneethylenediaminotetraphosphonate, methylenetriethylenetetraaminohexaphosphonate, methylenetetraethylenepentaaminoheptaphosphonate or methylenepentaethylenehexaaminooctaphosphonate.

11. The process as defined by claim 1, said at least one acid comprising methylenediphosphonate; 1,1'-ethylenediphosphonate; 1,2-ethylenediphosphonate; 1,1'-propylenediphosphonate; 1,3-propylenediphosphonate; 1,6-hexamethylenediphosphonate; 2,4-dihydroxypentamethylene-2,4-diphosphonate; 2,5-dihydroxyhexamethylene-2,5-diphosphonate; 2,3-dihydroxybutylene-2,3-diphosphonate; 1-hydroxybenzyl-1,1'-diphosphonate; 1-aminoethylene-1,1'-diphosphonate; hydroxymethylenediphosphonate; 1-hydroxyethylene-1,1'-diphosphonate; 1-hydoxypropylene-1,1'-diphosphonate; 1-hydroxybutylene-1,1'-diphosphonate; or 1-hydroxyhexamethylene-1,1'-diphosphonate.

12. The process as defined by claim 1, said titanium compound comprising a titanium halide, oxyhalide, nitrate or alkoxide.

13. The process as defined by claim 12, said titanium compound comprising titanium oxychloride.

14. The process as defined by claim 1, said solution of the titanium compound having a concentration of from 0.1 to 1.5 mole/liter of titanium.

15. The process as defined by claim 1, wherein the molar concentration of the at least one acid in said solution to be hydrolyzed ranges from 0.01 to 1 mole/liter.

16. The process as defined by claim 15, said molar concentration ranging from 0.01 to 0.1 mole/liter.

17. The process as defined by claim 1, carried out at a temperature of at least 70° C.

* * * * *